United States Patent [19]

Nappen et al.

[11] 4,191,786

[45] Mar. 4, 1980

[54] PREPARATION OF DISPERSIBLE CHOCOLATE LIQUOR BY EXTRUSION

[75] Inventors: Bernard H. Nappen, Cranford; Nicholas G. Marotta, Green Brook, both of N.J.

[73] Assignee: National Starch and Chemical Corporation, Bridgewater, N.J.

[21] Appl. No.: 921,528

[22] Filed: Jul. 3, 1978

[51] Int. Cl.$^2$ .......................... A23G 1/00; A23L 2/38
[52] U.S. Cl. .................................. 426/593; 426/459; 426/516; 426/517; 426/631; 426/650; 426/661
[58] Field of Search ............... 426/593, 631, 650, 661, 426/456, 457, 459, 471, 515, 516, 517, 519, 640

[56] References Cited

U.S. PATENT DOCUMENTS

| | | | |
|---|---|---|---|
| 2,106,089 | 1/1935 | Fick | 426/593 X |
| 3,940,505 | 2/1976 | Nappen et al. | 426/661 X |
| 3,966,997 | 6/1976 | Warkentin | 426/631 |
| 3,997,680 | 12/1976 | Chalin | 426/516 X |

*Primary Examiner*—Arthur L. Corbin
*Attorney, Agent, or Firm*—Edwin Szala; Janet E. Hasak

[57] ABSTRACT

In an improved process for preparing water-dispersible chocolate liquor, melted chocolate liquor is mixed with starch and water in selected proportions, and the resulting mixture is then passed through an extruder at an elevated pressure and temperature for a period of time sufficient to partially hydrate the starch and finally extruded through an orifice. The product is preferably obtained in powder form and may be used in many applications such as dry food mixes.

5 Claims, No Drawings

PREPARATION OF DISPERSIBLE CHOCOLATE LIQUOR BY EXTRUSION

BACKGROUND OF THE INVENTION

I. Field of the Invention

This invention relates to a process for preparing dispersible chocolate liquor employing an extrusion procedure.

II. Description of the Prior Art

Chocolate liquor is a low melting solid containing approximately 53% by weight of fat. Because of its high fat content, chocolate liquor is not water dispersible and cannot be used directly in dry mixes which must be reconstituted in water. As a consequence, no dry food formulations containing chocolate liquor are presently on the market. Chocolate liquor is introduced into commercially available dry mixes in the form of cocoa, which is a powdered chocolate liquor having most of the fat removed. However, cocoa is not a good substitute for chocolate liquor because much of the true flavor of the chocolate is lost in the defatting process by which cocoa is produced.

Another characteristic of chocolate liquor, in addition to its inability to disperse water, is the difficulty of forming a powder therefrom. While methods do exist for converting chocolate liquor into a free-flowing powder, such methods have serious drawbacks. For example, cryogenic grinding of the chocolate liquor results in a powder which is not stable unless refrigerated. Another method involving spray-congealing of the chocolate liquor with a carrier is expensive and necessitates high levels of carrier to lend stability to the chocolate. The technique of drum drying chocolate liquor or aqueous chocolate liquor will not result in a powder because the fat in the chocolate liquor will melt with the heat of the drum, causing the chocolate to merely drop from the roller.

U.S. Pat. No. 3,940,505 teaches a process for drying foodstuffs, e.g., vegetables and fruits, by blending the uncooked comminuted foodstuff with starch and drum drying the resultant starch blend.

A process for preparing dispersible chocolate liquor involving drum drying a mixture of melted chocolate liquor, starch and water is disclosed in U.S. patent application Ser. No. 907,652 filed May 22, 1978 to B. H. Nappen et al. This process yields a product directly in sheet form which may be pulverized to a free-flowing powder for use in food products.

It is a prime object of the present invention to provide an improved process for preparing dispersible chocolate liquor for use in dry food mix applications.

SUMMARY OF THE INVENTION

The above and related objects are achieved in a process for preparing dispersible chocolate liquor which comprises the steps of:

a. mixing melted chocolate liquor and starch in a ratio of melted chocolate liquor to starch of from 10:2.5 to 10:15, with 5–25%, by total weight of the mixture, of water;

b. passing the mixture through a heated extruder at an elevated pressure and temperature within the range of 110°–135° C. for a period of time sufficient to partially hydrate the starch; and c. extruding the mixture through an orifice.

Preferably, the ratio of melted chocolate liquor to starch is from 10:3 to 10:10, and most preferably 10:3 to 10:5.

In another preferred embodiment, the amount of water in the mixture is 5–10% by total weight of the mixture, whereby the product is extruded directly in powder form.

The extrusion process for preparing dispersible chocolate liquor disclosed herein offers distinct advantages over the analogous drum-drying process of the prior art. The extrusion process has lower energy requirements because the extrusion step is conducted at lower temperatures and no further drying of the product is necessary. If the high temperatures used in drum drying are employed in the extrusion operation, the resulting product will be scorched and not suitable for use. Furthermore, lower amounts of water are required for the extrusion process, and when the mixture contains no greater than 10% water, the extruded product is obtained directly as a powder, with no need for pulverizing. When the mixture contains higher levels of water, the extruded product is obtained as a rope or strand, which can be cut or sliced into pieces to use as chocolate bits for cookies, cakes, etc. In addition, the product of the process of this invention has a much more chocolate aroma and taste than the drum-dried product of the prior art using the same level of chocolate liquor.

DESCRIPTION OF THE PREFERRED EMBODIMENTS

The term chocolate liquor as used herein refers to a cocoa mass in the solid form having about 53% fat content and melting at about 40° C.

The chocolate liquor may be melted using any suitable technique such as by heating in a steam bath or in a steam-jacketed kettle. Alternatively, hot water may be added to the chocolate liquor to effect melting thereof. The chocolate liquor will begin to melt at a temperature of about 38° C. and will be completely melted at 41° C. It is important that the chocolate liquor be thoroughly melted before being mixed with the starch to insure homogeneity and total dispersibility of the final product.

The particular starch used is not an essential feature of this invention. Satisfactory results are achieved using various starches suitable for use in food products such as those derived from corn, potato, rice, sago, tapioca, waxy maize, wheat, etc., with tapioca starch being preferred due to its better taste and low viscosity characteristics. The starch may be employed in its granular or pregelatinized form. Furthermore, modified starches such as dextrins prepared by the hydrolytic action of acids and/or heat, oxidized starches prepared by treatment with oxidants, e.g., sodium hypochlorite, and fluidity or thin-boiling starches prepared by enzyme conversion or by mild acid hydrolysis may be employed. In addition, the starch may be chemically derivatized as by means of an esterification reaction to give esters, for example, the acetates, propionates, and butyrates; or by etherification to yield, for example, hydroxyethyl, hydroxypropyl or carboxymethyl ethers. It is also within the scope of the invention to use mixtures of starch as the starch component or starches coated with a material such as e.g., gelatin. In addition, it should be noted that for the purpose of this invention the term "starch" is also meant to include flours and meals derived from any of the above-described starches since these are also applicable for use in the novel process of this invention.

Depending on the characteristics required by the use of the dispersible chocolate liquor, the starch may be derivatized, crosslinked, etc. For example, if the reconstituted chocolate liquor is to be used in a product which will be retorted, it may be desirable to employ a suitably inhibited, hydroxypropylated food starch in the process for preparing the dispersible chocolate liquor. Similarly, if freeze-thaw properties are required in the final product, the starch employed may be treated prior to its use in the process with both a polyfunctional etherification or esterification reagent and with acetic or propionic anhydride as taught in U.S. Pat. No. 2,935,510.

The starch is mixed with the melted chocolate liquor and water in the desired proportions using any suitable blending or mixing equipment.

The amount of added water required to complete the extrusion mixture must be sufficient to prevent the components from scorching under the particular extrusion conditions employed. This specific amount will depend on the starch, the form of end-product desired, e.g., powder or chips, and the temperature and pressure employed in the extrusion operation. In general, concentrations of water ranging from about 5 to 25%, preferably 5 to 10%, based on the total weight of the mixture, are employed. It should be noted that the moisture which may be inherently present in the various components of the composition is not included in determining the amount of water which is to be added to the mixture. When lower levels of water, i.e., 5–8%, are employed, the extruded product is obtained directly in powder form. Higher amounts of water, e.g., 15–25%, result in a strand of product which can be cut into pieces and shaped as desired. If the mixture contains amounts of water over about 25%, however, a satisfactory product will not be obtained.

The water may be added at any point in the mixing process. Thus, it may be added initially at a hot temperature to melt the chocolate liquor, or it may be added to the premelted chocolate liquor or to the starch, or to the mixture of starch and chocolate liquor. Where it is not desired to initially add the entire concentration of water to the mixture, the balance may be injected, in the form of steam or as hot or cold water, directly into the feed throat of the extruder.

Before the extrusion operation, artificial flavorings, colorings, etc. may be added to the mixture, although this is not deemed necessary since the natural chocolate taste and aroma are retained to such a large extent in the product of the process herein.

When the mixture is thoroughly blended, it is then passed through a heated extruder, by means of a pump, ram, double motion ribbon blender, or any other suitable apparatus. For the extrusion step, any device capable of subjecting the mixture to the heat and pressure necessary to partially hydrate the starch and to force the mixture through an orifice or multiplicity of orifices at the terminal end of the apparatus may be employed. The device may also be capable of effecting some simultaneous shearing action. These operations may be carried out as either batch or continuous procedures. The extruder is typically fitted with a heating or cooking section and a forming section in which the mixture is preferably cooled and an orifice or die which gives the product its final shape. A wide variety of orifice shapes may be used including, for example, straight or serrated slits, round or oval openings, fluted circular and tube opengings, etc. It is also possible to extrude the product in the form of a rope, a ribbon or a thin sheet so that at higher levels of water in the chocolate mixture, the desired shape of the individual pieces of the ultimate food product may be cut from the resulting ropes, ribbons and sheets.

The temperature required within the extruder depends upon the amount and type of starch present in the mixture as well as on the moisture content thereof, but generally must be maintained within the range of about 230° F. to 275° F. (110°–135° C.) to prevent scorching of the product in the extruder.

The temperature within the forming section of the extruder and the temperature of the extruder die itself will in most instances be kept within the range of from about 75° to 200° F. (24°–93° C.). The precise temperature employed within the above cited range is also directly related to the composition of the extruded mixture.

The pressure utilized within the extrusion mechanism will vary with the type of extruder, the compression ratio and speed of the screw employed, the nature of the material being extruded, the construction of the die, the temperature being used and the amount of water present, etc. Typical pressures will generally range from about 50 to 1000 psig. although pressures of from about 125–300 psig. are preferred.

The residence time of the mixture in the entire extruding system is generally within the range of about 0.5 to 2 minutes in order to produce a satisfactory product. This amount of time allows some of the starch granules to partially hydrate, or swell, as is desired in the final product.

As stated hereinabove, if the water content of the original mixture is low, the product obtained from the extruder will be powdered and can be used or packaged immediately. With higher levels of water, under optimum conditions, the end-product will be extruded as a non-tacky, shape-retaining mass which can be immediately cut at high speeds, and which on further cooling will increase in rigidity. The necessity for allowing the resulting mass to set upon the conclusion of the extrusion operation with high initial levels of water in the mixture is primarily dependent upon the exact concentration of water and the type and concentration of starch which is present in the chocolate product as well as on the degree of cooling which is applied.

In general, it is not necessary to dry the extruded chocolate product because the final moisture content will be within the desirable range of about 2 to 10% by weight, depending on the amount of water originally present in the mixture. If additional drying is desired, however, when relatively large quantities of water (up to 25%) are used to form the mixture, such drying may be carried out by any suitable means, preferably by allowing the extrudate to dry as a matter of course to the desired moisture content. The formed piece will be characterized by a uniform moisture content throughout the entire cross-section.

The chocolate liquor product thus obtained is highly dispersible in water and has an aroma and taste which are superior to that of the dispersible product obtained by drum drying the mixture of starch, water and melted chocolate liquor. The product herein may be stored for extended periods of time at room temperature without any deleterious effect whatsoever and may be used in any food formulations wherein chocolate liquor is a necessary and/or desirable ingredient to lend a real chocolate flavor thereto, thus replacing the cocoa powder presently employed for this purpose. Examples of foods wherein the product of the process herein may be employed include cookie, cake and brownie mixes, drink mixes, puddings and pie fillings, icings, etc.

It is to be noted that the dispersible chocolate liquor products of this invention can only be adequately described by making reference to the process which has been utilized for their preparation.

Both samples were evaluated for various properties against a product prepared by the prior art process (U.S. patent application Ser. No. 907,652 filed May 22, 1978) of drum drying a mixture of chocolate liquor, starch and water having the same ratio of chocolate liquor to starch (70:30) as Samples B and C. The drum-dried product was pulverized to a powder before evaluation. The results are indicated in Table I.

TABLE I

| Sample | Starch Employed | Taste and Aroma of Product | Microscopic Analysis of Product (amount of shattered starch granules) | 20% Dispersion of Product in Water (Properties) |
|---|---|---|---|---|
| B | Tapioca | excellent | small | pourable, slight surface oil, no separation of fat |
| C | Acid-converted corn starch of 60 fluidity | excellent | very small | very pourable (low viscosity), much surface oil complete separation of fat after 30 min. |
| Drum-dried product of prior art process | Tapioca | good | large | thick and non-pourable, texture like tapioca(long, gummy), no surface oil or separation |

The invention will be further illustrated by the examples which follow.

In these examples all parts and percentages are given by weight unless otherwise noted.

EXAMPLE I

A chocolate liquor product designated as Sample A was prepared as follows:

A total of 22.50 parts hot water was added to 54.25 parts commercially obtained chocolate liquor until the liquor was thoroughly melted. Tapioca starch was then added in an amount of 23.25 parts. The resulting mixture was stirred and then fed into a Wenger ® X-5 extruder at a temperature of 121° C. at 500 rpm. and at a feed rate so as to have a residence time in the extruder of about 30 seconds. The chocolate product was removed before one revolution was complete and was obtained as an elongated rope, which was sliced into small pieces. The product was brown in color, homogeneous, and completely dispersible in water.

To test the effect of extrusion temperature on the product, the mixture of Sample A was extruded in an identical manner as described above except that the temperature of the extruder was raised to 149° C., the rpm. to 750, and the feed rate was increased slightly. The product obtained thereby was scorched due to the high temperature of the extruder and blocked the extruder barrel so that it was difficult to remove. It can be seen that extruder temperatures of over about 135° C. should not be employed.

EXAMPLE II

This example illustrates the preparation of chocolate liquor products in powder form.

Two chocolate liquor products designated as Samples B and C in Table I were prepared as described in Example I using 7.0 parts hot water, 65.1 parts of chocolate liquor, and 27.9 parts of the indicated starch. The temperature of extrusion was 116°–121° C. at 500 rpm., and the feed rate was as in Example I. Samples B and C extruded well, and the final products were obtained in stable, free-flowing, dry powder form.

From the results it can be seen that the drum-dried chocolate liquor has properties of a product containing completely hydrated or cooked starch due to the high temperatures employed in its preparation, with the cooked starch component acting to thicken the water dispersion to an unpourable state. In contrast, the extruded products are only partially hydrated, as evidenced by the presence of a small amount of swelling in the granules, and as a result their dispersions are relatively non-viscous. The taste and aroma of the extruded products are found to be superior to that of the drum-dried product.

Because tapioca starch yields a product which, whether extruded or drum-dried, gives a dispersion in water which is homogeneous (i.e., with no separation of fat), it is the preferred starch for use herein.

EXAMPLE III

This example illustrates the preparation of an additional chocolate liquor product and its use in a dry brownie formulation.

The mixture of Sample B of Example II was prepared and extruded in an identical manner using a tapioca dextrin instead of raw tapioca starch. The resulting product was water-dispersible and obtained in the form of a free-flowing brown powder with excellent taste and aroma characteristics.

When the product thus obtained is used to replace the cocoa ingredient in a conventional brownie mix, the resulting baked brownies are found to have superior taste and texture.

Summarizing, this invention is seen to provide a stable, water-dispersible chocolate liquor product, preferably in free-flowing powder form, by blending starch, melted chocolate liquor and water together in selected proportions and extruding the resultant blend.

Now that the preferred embodiments of the present invention have been described in detail, various modifications and improvements thereon will become readily apparent to those skilled in the art. Accordingly, the spirit and scope of the invention are to be limited only by the appended claims, and not by the foregoing specification.

What is claimed is:

1. A process for preparing dispersible chocolate liquor which consists essentially of the steps of:
   a. mixing melted chocolate liquor and starch, in a ratio of melted chocolate liquor to starch of from 10:2.5 to 10:15, with from 5 to 25%, by total weight of the mixture, of water;
   b. passing the mixture through a heated extruder at an elevated pressure and temperature within the range of 110°–135° C. for a period of time sufficient to partially hydrate the starch; and
   c. extruding the mixture through an orifice.

2. The process of claim 1 wherein the water in the mixture is present in an amount of from 5 to 10% by total weight of the mixture.

3. The process of claim 1 wherein the ratio of melted chocolate liquor to starch is from 10:3 to 10:10.

4. The process of claim 3 wherein the ratio of melted chocolate liquor to starch is from 10:3 to 10:5.

5. The process of claim 1 wherein the starch is tapioca starch.